(12) United States Patent
Vemula et al.

(10) Patent No.: US 9,749,124 B2
(45) Date of Patent: Aug. 29, 2017

(54) SYMBOL BOUNDARY DETECTION

(71) Applicant: Imagination Technologies Limited, Kings Langley (GB)

(72) Inventors: G. K. Murthy Vemula, Hyderabad (IN); Somya Sharma, Hyderabad (IN); Paul Reuben Vincent, Hyderabad (IN); Venkatesh Sasanpuri, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 14 days.

(21) Appl. No.: 14/920,256

(22) Filed: Oct. 22, 2015

(65) Prior Publication Data

US 2016/0119116 A1    Apr. 28, 2016

(30) Foreign Application Priority Data

Oct. 22, 2014 (GB) .................................. 1418751.2

(51) Int. Cl.
| | |
|---|---|
| H04L 27/26 | (2006.01) |
| H04L 7/00 | (2006.01) |
| H04L 25/02 | (2006.01) |

(52) U.S. Cl.
CPC ........ H04L 7/0087 (2013.01); H04L 25/0212 (2013.01); H04L 27/2607 (2013.01);
(Continued)

(58) Field of Classification Search
USPC ................................................ 375/259, 260
See application file for complete search history.

(56) References Cited

U.S. PATENT DOCUMENTS

2003/0016773 A1*  1/2003  Atungsiri ............ H04L 27/2695
                                                                    375/355
2006/0140293 A1  6/2006  Lai et al.
(Continued)

FOREIGN PATENT DOCUMENTS

EP          0841787 A2     5/1998
EP          1424821 A2     6/2004
(Continued)

OTHER PUBLICATIONS

T. Schmidl and D. C. Cox, "Robust frequency and timing synchronization for OFDM", IEEE Trans. Commun., vol. 45, No. 12, pp. 1613-1621, Dec. 1997.

*Primary Examiner* — Kevin M Burd
(74) *Attorney, Agent, or Firm* — Vorys, Sater, Seymour and Pease LLP; Vincent M DeLuca

(57) ABSTRACT

A symbol boundary in a data packet having a guard interval preceding a preamble having a predetermined sequence of symbols is detected by receiving a signal representing a data packet; sampling the received signal at a sampling rate; estimating channel impulse responses from a set of samples in dependence on the predetermined sequence of symbols of the preamble; determining an energy value for each of a plurality of windows of channel impulse responses, each of the windows corresponding to W number of consecutive samples, the energy value for each of the windows being indicative of the total energy associated with the channel impulse responses of that window; determining which of the windows has the greatest energy value; and identifying the earliest sample of the consecutive W samples in said determined greatest energy window, the earliest sample being indicative of a symbol boundary for the preamble.

18 Claims, 6 Drawing Sheets

(52) U.S. Cl.
CPC ...... *H04L 27/2656* (2013.01); *H04L 27/2662* (2013.01); *H04L 27/2663* (2013.01); *H04L 27/2675* (2013.01); *H04L 27/2692* (2013.01); *H04L 27/2695* (2013.01)

(56) References Cited

U.S. PATENT DOCUMENTS

2012/0230453 A1* 9/2012 Shih .................. H04L 25/0212
375/343
2013/0136198 A1 5/2013 Chavali et al.

FOREIGN PATENT DOCUMENTS

| EP | 1774741 A1 | 4/2007 |
| EP | 1856876 A1 | 11/2007 |
| EP | 2039093 A1 | 3/2009 |
| WO | 2007012020 A2 | 1/2007 |

* cited by examiner

SYMBOL BOUNDARY DETECTION

BACKGROUND OF THE INVENTION

This invention relates to detecting the symbol boundary in orthogonal frequency division multiplexing (OFDM) signals, such as IEEE 802.11 for a Wireless Local Area Network (WLAN) OFDM signals.

OFDM systems use multi narrow-band sub-channels for improved tolerance to multipath delay. The sub-channels are orthogonal to each other to prevent inter-carrier interference (ICI). One problem with OFDM systems is that they can be very sensitive to synchronization errors. A wrong estimation of a symbol boundary in OFDM leads to increased inter symbol interference (ISI) and ICI, which degrades the performance of the OFDM system. Thus it is desirable to provide an accurate estimation of a symbol boundary.

A WLAN OFDM data packet has a standard field structure. As an example, the field structure of a packet used in 802.11a/g is shown in FIG. 1. The data packet 100 includes a short training field (STF) 101, a long training field (LTF) 102, a signal (SIG) field 103 and a rest of packet (ROP) field 104.

The STF 101 includes a set of ten identical short preambles S1, S2, . . . , S10, each having a duration of 0.8 µs. The STF 101 is followed by the LTF 102. The LTF 102 includes a double guard interval (DGI) and two identical long preambles L1 and L2. DGI is of 1.6 µs duration. The DGI is followed by the two identical long preambles L1 and L2, each having a time duration of 3.2 µs. The samples of the DGI are a copy of the samples in the last 1.6 µs duration of L1 or L2. The LTF 102 is followed by the SIG field 103, which includes L-SIG (non-high throughput (non-HT) signal field) for 802.11a/g, or L-SIG (non-HT signal field) and HT signal field (HT-SIG) for 802.11n HT transmission, or HT-SIG for 802.11n GreenField transmission, or L-SIG and very high throughput signal field (VHT-SIG-A) for 802.11 ac VHT transmission.

The ROP field 104 may include additional STF and LTFs and signal fields depending on the type of transmission. The ROP field 104 includes the payload data, which is represented as data symbols of 3.2 µs duration. Each data symbol is preceded by samples of guard interval duration from the end of the data symbol. Guard interval (GI) of 0.8 µs (long GI) or 0.4 µs (short GI) is used in WLAN OFDM transmission.

For extracting payload data from the data packet 100, the correct boundary of OFDM symbols must be known. The symbol boundary can be found using the known information of the STF and the LTF of the received packet. Traditionally, two methodologies have been used to find the symbol boundary. The first method finds the boundary between S10 and DGI (the S10-DGI boundary), and the second one finds the boundary between DGI and L1 (the DGI-L1 boundary).

The S10-DGI boundary is usually found using an auto-correlation scheme. However, due to high noise and low Signal to Noise Ratios (SNRs), the boundary position determined using such schemes is offset from the correct boundary due to the poor correlation metric of short preambles at low SNR. Thus, the timing variance of the auto-correlation synchronization scheme is large and may degrade performance of the OFDM system. Accordingly, such auto-correlation synchronization schemes are used to achieve only a coarse estimate of the S10-DGI boundary.

The DGI-L1 boundary can be found using a fine symbol boundary (FSB) algorithm, such as the FSB algorithm in Schmidl, T. M. and Cox, D. C., "Robust Frequency and Timing Synchronization for OFDM", IEEE Trans. Commun., vol. 45, no. 12, pp. 1613-1621, December 1997, which uses the auto-correlation based on the long preambles. However, this algorithm suffers from high latency, low accuracy for low SNRs and does not cover the precursors of the channel.

SUMMARY

According to a first aspect of the present disclosure there is provided a method for detecting a symbol boundary in a data packet comprising a guard interval preceding a preamble having a predetermined sequence of symbols, the method comprising: receiving a signal representing a data packet; sampling the received signal at a sampling rate; estimating channel impulse responses from a set of samples in dependence on the predetermined sequence of symbols of the preamble; determining an energy value for each of a plurality of windows of channel impulse responses, each of the windows corresponding to W number of consecutive samples, the energy value for each of the windows being indicative of the total energy associated with the channel impulse responses of that window; determining which of the windows has the greatest energy value; and identifying the earliest sample of the consecutive W samples in the determined greatest energy window, the earliest sample being indicative of a symbol boundary for the preamble.

The plurality of windows may comprise successive windows of W samples, each successive window being offset by one sample from a previous window in the succession.

W may be dependent on the sampling rate and a duration of the guard interval.

The guard interval duration may be 0.8 µs or 0.4 µs.

The data packet may further comprise a short training field preceding the guard interval, the method may further comprise estimating a boundary between the short training field and the guard interval, the set of samples being taken from the estimated boundary for a period corresponding to the duration of the preamble.

The received signal may comprise a first signal transmitted from one antenna and one or more other signals transmitted from respective one or more other antennas, the other signals being the same as the first signal and shifted by predetermined amount of time up to a maximum shift equal to −d, the method further comprising the steps of: identifying a sample $n_{lgi}$ which is the earliest sample in the window of channel impulse response of duration W having the greatest energy; calculating a sample range in dependence on sample $n_{lgi}$, a peak sample $n_{max}$ and a $W_s$ number of samples corresponding to the duration of a short guard interval; determining an energy value for each of a plurality of second windows of channels impulse response, each second window corresponding to $W_s$ number of consecutive samples, the plurality of second windows being within the sample range, the energy value for each second window being indicative of the total energy associated with the channel impulse responses of respective $W_s$ samples; determining which second window has the greatest estimated energy value; identifying the earliest sample of the consecutive $W_s$ samples in the determined second window, the earliest sample for the determined second window being indicative of a symbol boundary.

W may correspond to a number of samples for the duration of a long guard interval.

The step of calculating a sample range may comprise: identifying the channel impulse response having the greatest energy as $n_{max}$; and determining if $n_{max}$ is for the first signal or the one of the other signals in dependence on $n_{lgi}$ and $W_s$.

The step of calculating the sample range may comprise setting the start of the range as $n_c-W_s+1$, and the end of the range as $n_c-W_s-1$, wherein $n_c=n_{max}$ if $n_{max}$ is for the first signal or $n_c=n_{max}-d$ if $n_{max}$ is for one of the other signals.

The first and other signals may be transmitted over channels having a channel width corresponding to less than d.

The received signal may comprise a first signal transmitted from a first transmit antenna and a plurality of shifted signals transmitted from a plurality of other transmit antennas, each shifted signal being shifted by a different predetermined amount time from the first signal, and the first and other signals being received at a corresponding number of receive antennas, the method further comprising: decoupling the channel impulse response for the channels between each transmit antenna and each receive antenna; and summing the decoupled channel impulse responses, the step of determining an energy value for each of a plurality of sets being carried out on the summed channel impulse responses.

The received signal may be an OFDM signal.

The received signal may be a signal in accordance with an IEEE 802.11 protocol.

According to a second aspect there is provided a receiver comprising: an antenna configured to receive a signal representing a data packets, wherein each data packet comprises a guard interval preceding a preamble having a predetermined sequence of symbols; a sampler configured to sample the received signal at a sampling rate; and a symbol boundary estimator configured to: estimate channel impulse responses from a set of samples in dependence on the predetermined sequence of symbols of the preamble; determine an energy value for each of a plurality of windows of channel impulse responses, each of the windows corresponding to W number of consecutive samples, the energy value for each of the windows being indicative of the total energy associated with the channel impulse responses of that window; determine which of the windows has the greatest estimated energy value; and identify the earliest sample of the consecutive W samples in the determined greatest energy window, the earliest sample being indicative of a symbol boundary for the preamble.

The plurality of windows may comprise successive windows of W samples, each successive window being offset by one sample from a previous window in the succession.

W may be dependent on the sampling rate and a duration of the guard interval.

The guard interval duration may be 0.8 μs or 0.4 μs.

The data packet may further comprise a training field preceding the guard interval, the symbol boundary estimator being further configured to estimate a boundary between the training field and the guard interval, the set of samples being taken from the estimated boundary for a period corresponding to the duration of the preamble.

The receiver may further comprise one or more other receive antennas, wherein the received signal comprises a first signal transmitted from one transmit antenna and one or more other signals transmitted from respective one or more other transmit antennas, the other signals being the same as the first signal and shifted by predetermined amount of time up to a maximum shift equal to −d, the symbol boundary estimator being further configured to: identify a sample $n_{lgi}$ which is the earliest sample in the window of channel impulse responses of duration W having the greatest energy; calculate a sample range in dependence on sample $n_{lgi}$, a peak sample $n_{max}$ and a number Ws of samples corresponding to the duration of a short guard interval; determine an energy value for each of a plurality of second windows of channel impulse responses, each second window corresponding to Ws number of consecutive samples, the plurality of second windows being within the sample range, the energy value for each second window being indicative of the total energy associated with the impulse responses of respective Ws samples; determine which second window has the greatest estimated energy value; and identify the earliest sample of the consecutive Ws samples in the determined second window, the earliest sample for the determined second window being indicative of a symbol boundary.

W may correspond to a number of samples for the duration of a long guard interval.

The symbol boundary detector may be configured to calculate the sample range by: identifying the channel impulse response having the greatest energy as $n_{max}$; and determining if $n_{max}$ is for the first signal or one of the other signals in dependence on $n_{lgi}$ and $W_s$.

The symbol boundary detector may be configured to calculate the sample range by setting the start of the range as $n_c-W_s+1$, and the end of the range as $n_c-W_s-1$, wherein $n_c=n_{max}$ if $n_{max}$ is for the first signal or $n_c=n_{max}-d$ if $n_{max}$ is for one of the other signals.

The first and other signals may be transmitted over channels having a channel width corresponding to less than d.

The received signal may comprise a first signal transmitted from a first transmit antenna and a plurality of shifted signals transmitted from a plurality of other transmit antennas, each shifted signal being shifted by a different predetermined amount time from the first signal, and the receiver comprising a corresponding number of receive antennas configured to receive the first and other signals, the symbol boundary estimator being further configured to: decouple the channel impulse response for the channels between each transmit antenna and each receive antenna; and sum the decoupled channel impulse responses, the step of determining an energy value for each of a plurality of sets being carried out on the summed channel impulse responses.

The receiver may be configured to receive OFDM signals.

The receiver may be configured to operate in accordance with an IEEE 802.11 protocol.

According to a third aspect there is provided machine readable code for implementing the method described above.

According to a fourth aspect there is provided a machine readable storage medium having encoded thereon non-transitory machine-readable code implementing the method described above.

DESCRIPTION OF THE DRAWINGS

The present invention will now be described by way of example with reference to the accompanying drawings, in which.

DETAILED DESCRIPTION OF THE INVENTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Examples described herein provide a new, energy based method of determining a symbol boundary in an OFDM system with preamble that has a predetermined sequence of symbols. For a received signal, a coarse estimate of the symbol boundary may first be made using a method such as an auto-correlation based boundary estimation. Channel impulse responses can be calculated from samples of the received signal using the predetermined preamble symbols. The energy for each of a plurality of windows of channel impulse responses can be determined, wherein each window corresponds to W number of consecutive samples. The energy value for each window is indicative of the total energy associated with that window. In examples described herein, the window that has the greatest estimated energy value is determined and the earliest sample of the consecutive W samples in the greatest energy window is identified. The earliest sample is indicative of the symbol boundary. As described in more detail below, this method allows the symbol boundary to be determined for packets transmitted in single-input single-output systems and in multiple-input multiple-output systems operating with narrowband or wideband channels.

Figure 1:
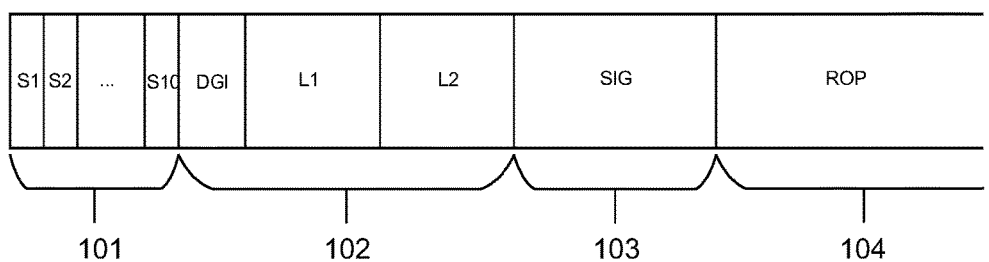
FIG. 1 shows a structure of a packet in accordance with the IEEE 802.11 standard.
Figure 2:
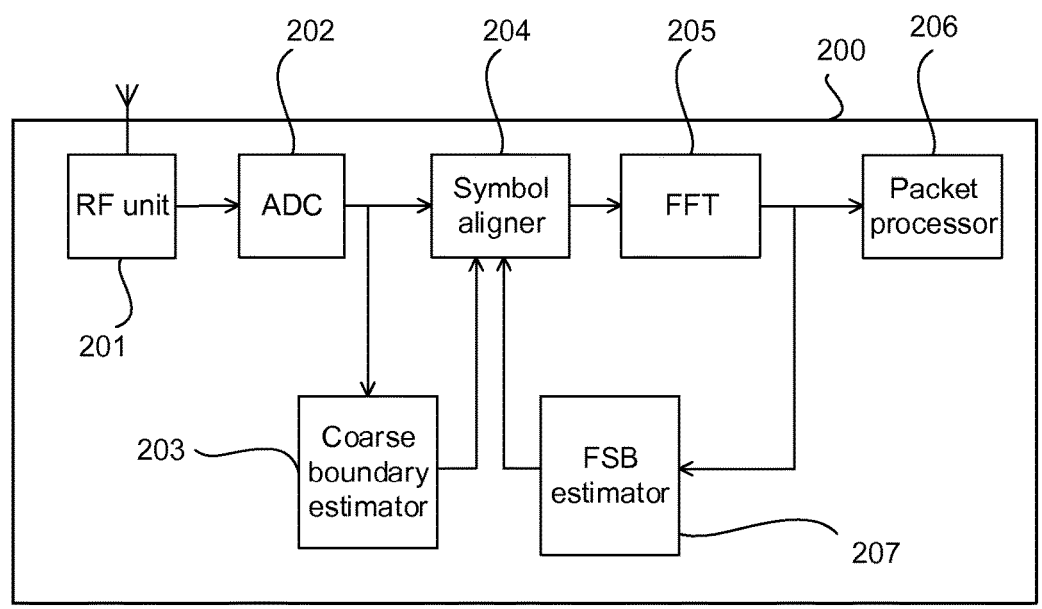
FIG. 2 shows a schematic diagram of a receiving device.

FIG. 2 shows a receiving device 200 comprising an RF receiver unit 201, an analogue-to-digital converter (ADC) 202, a coarse boundary estimator 203, a symbol aligner 204, a fast Fourier transform (FFT) unit 205, a packet processor 206 and a fine symbol boundary (FSB) estimator 207.

The RF receiver unit 201 receives an analogue OFDM signal and provides it to the ADC 202. The ADC 202 samples the analogue OFDM signal and feeds it to the symbol aligner 204. The symbol aligner 204 aligns the samples so that the input to FFT unit 205 is the 3.2 μs of samples for each data symbol. The sample rate of the ADC 202 may be dependent on the bandwidth of the signal to be received, which may be, for example, 20, 40, 80 or 160 MHz. The sampled signal is also fed to the coarse boundary estimator 203, which provides a coarse estimate of the symbol boundary for the received signal and provides that estimate to the symbol aligner 204.

The symbol aligner 204 aligns the samples initially according to the coarse estimated symbol boundary from the coarse boundary estimator 203. The symbol aligner 204 feeds the aligned samples to the FFT unit 205. The FFT unit 205 computes the discrete Fourier transform (DFT) of the samples. The DFT of the samples is fed back into the FSB estimator 207 so that the FSB can be estimated. The FSB estimate is provided to the symbol aligner 204 which aligns the symbols according to that estimate. The FFT unit 205 transforms the signal into a frequency domain signal, from which the payload data can be obtained via further processing at the packet processor 206.

The correct start position (i.e., the symbol boundary) of the time domain sampled signal should be accurately estimated so that the FFT is performed at the proper time so as to avoid ISI effectively. The coarse boundary estimator 203 determines an estimate of the symbol boundary and provides it to the symbol aligner 204 so that the samples can be properly aligned for the FFT.

The plurality of time-sequential samples obtained from ADC 202 is provided to the coarse boundary estimator 203, which coarsely estimates the time of the S10-DGI boundary. This coarse estimation can be carried out using any method known in the art, such as auto-correlation using the short preamble.

From the coarse estimation of the S10-DGI boundary, a rough estimation of the time of the DGI-L1 boundary can be determined. The FSB estimator 207 utilises 3.2 μs of samples from the time of the estimated S10-DGI boundary to provide a finer estimation of the time of the DGI-L1 boundary. An N-point discrete Fourier transform (DFT) is performed on these samples by the FFT unit 205 to convert the sampled signal from the time domain to the frequency domain, where N is the total number of time-domain samples of the signal in the 3.2 μs period.

The long preamble L1 has a predetermined sequence of symbols (which is defined by the appropriate 802.11 standard) and so the long preamble is known by the receiving device 200. Thus the long preamble signal in the frequency domain is also known by the receiver. The FSB estimator 207 compensates each of the frequency domain samples with the known frequency domain values of the long preamble signal. Each frequency domain sample is compensated by multiplying the N-point DFT output for the sample with the conjugate of frequency domain values of the known long preamble.

The following equations and steps below generally describe the procedure carried out by the FSB estimator 207 to determine the DGI-L1 boundary.

For n=1, 2, . . . , N samples, $$y(n)=h(n) \otimes_N x(n)+w(n)$$

where y(n) is the received signal in the time-domain, h(n) is the channel in the time-domain, x(n) is the transmitted signal in the time-domain and w(n) is the noise signal in the time-domain.

Assuming the coarse boundary estimation is off by M samples, the received signal is the M samples delayed version of the long preamble signal p(n), so $$y(n)=h(n) \otimes_N p(n-M)+w(n)$$

DFT is applied for k=1, 2, . . . , N $$z(k) = g(k)p(k)e^{\frac{-j2\pi Mk}{N}} + w(k)$$

where g(k) is the channel in the frequency-domain, p(k) is the long preamble in the frequency-domain, z(k) is the obtained signal in the frequency domain and w(k) is noise.

The known frequency domain long preamble p(k) can be compensated in the above equation by multiplication of both sides by the conjugate of p(k).

Hence, $$z(k)p^*(k) = g(k)p(k)p^*(k)e^{\frac{-j2\pi Mk}{N}} + w(k)p^*(k)$$

As $p(k)p^*(k)=1$, we get:

$$\tilde{z}(k) = g(k)e^{\frac{-j2\pi Mk}{N}} + \tilde{w}(k)$$

where $\tilde{z}(k)$ and $\tilde{w}(k)$ are intermediate signals, with $\tilde{z}(k)=z(k)p^*(k)$ and $\tilde{w}(k)=w(k)p^*(k)$.

An inverse DFT (IDFT) is applied on both sides of above equation. For $n=1, 2, \ldots, N$, this results in $$c(n)=h(n-M)+\tilde{w}(n)$$

where $c(n)$ is the estimated channel in the time domain, which is estimated using the known long preamble. In a noise-free environment, $c(n)$ is the shifted version of $h(n)$. From the estimated channel $c(n)$, the FSB can be found as described below with reference to FIG. 3.

Figure 3:
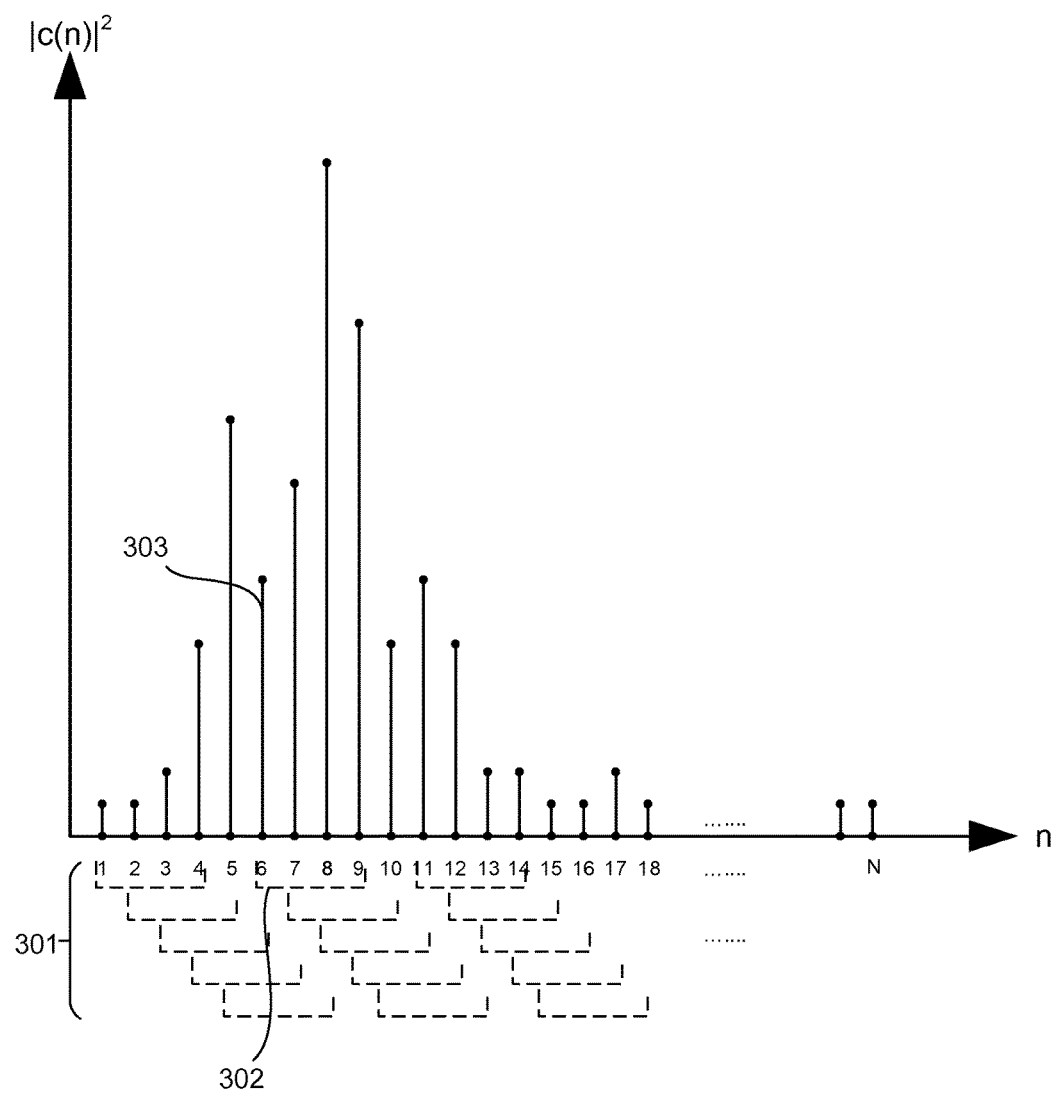
FIG. 3 shows an example channel impulse response for a single-input single-output (SISO) system.

FIG. 3 shows an example of the channel impulse response in a single-input single-output (SISO) system. The graph shows the energy of N samples (or channel taps). The channel taps represent impulse responses of channels.

Since for an ISI-free OFDM system the number of channel taps with significant energy (e.g. taps that have energy that ≥90% higher than the rest of the taps) should be less than the number of samples for the guard interval, a sliding window 301 is used to measure the energy of a number of taps within a duration (i.e. the window size) that corresponds to the duration of the GI.

As shown in FIG. 3, the window 301 moves along the x-axis one tap at a time so that the energy of the channel taps in the GI-sized window can be determined. The window position 302 with the greatest energy is determined. The first (i.e. earliest) tap 303 in the window 302 is selected to be an estimate of the position of the FSB. Selecting the earliest tap 303 as the FSB helps to mitigate the effect of ISI for L1.

In multiple-input-multiple-output (MIMO) OFDM systems, when transmitting and receiving with multiple antennas, the receiving device can suffer from undesirable beam forming if every antenna transmits the same signal. In IEEE 802.11 systems, the preambles transmitted by different antennas are shifted cyclically. This leads to additional complications when determining the FSB due to the use of multiple cyclically shifting signals.

For example, in a $2 \times N_{rx}$ MIMO system (i.e. 2 transmitters and 1 or more receivers), both transmitters transmit the same long preamble signal but with a cyclic shift (d) (in the time domain) between the first and second transmitters. The cyclic shift causes the estimated channel for $i^{th}$ receive antenna $c_i(n)$ to contain the channel information of both transmitters with cyclic shift d. The estimated channel can be given by For $i\in[1\ N_{rx}]$ and $n=1, 2, \ldots, N$ $$y_i(n)=h_{i1}(n)\otimes_N x_1(n)+h_{i2}(n)\otimes_N x_2(n)+w_i(n)$$

where $y_i(n)$ is the received signal in the time-domain, $h_{i1}(n)$ and $h_{i2}(n)$ are the channels in the time-domain between the first and second antennas of the transmitter and the $i^{th}$ receiver respectively, $x_1(n)$ and $x_2(n)$ are the transmitted signals in the time-domain by the first and second transmitters respectively and $w_i(n)$ is the noise signal in the time-domain.

The received signal is the M samples delayed version of the long preamble signal p(n) and there is a cyclic shift d between the signals transmitted by the first and second transmitters, so:

$$y_i(n)=h_{i1}(n)\otimes_N p(n-M)+h_{i2}(n)\otimes_N p(n-M+d)+w_i(n)$$

Similarly to above, DFT is applied to the signal, the frequency-domain signal is then compensated using the known long preamble signal in the frequency-domain and an IDFT is applied to the estimated channel to give:

$$c_i(n)=h_{i1}(n-M)+h_{i2}(n-M+d)+\tilde{w}(n)$$

Figure 4:
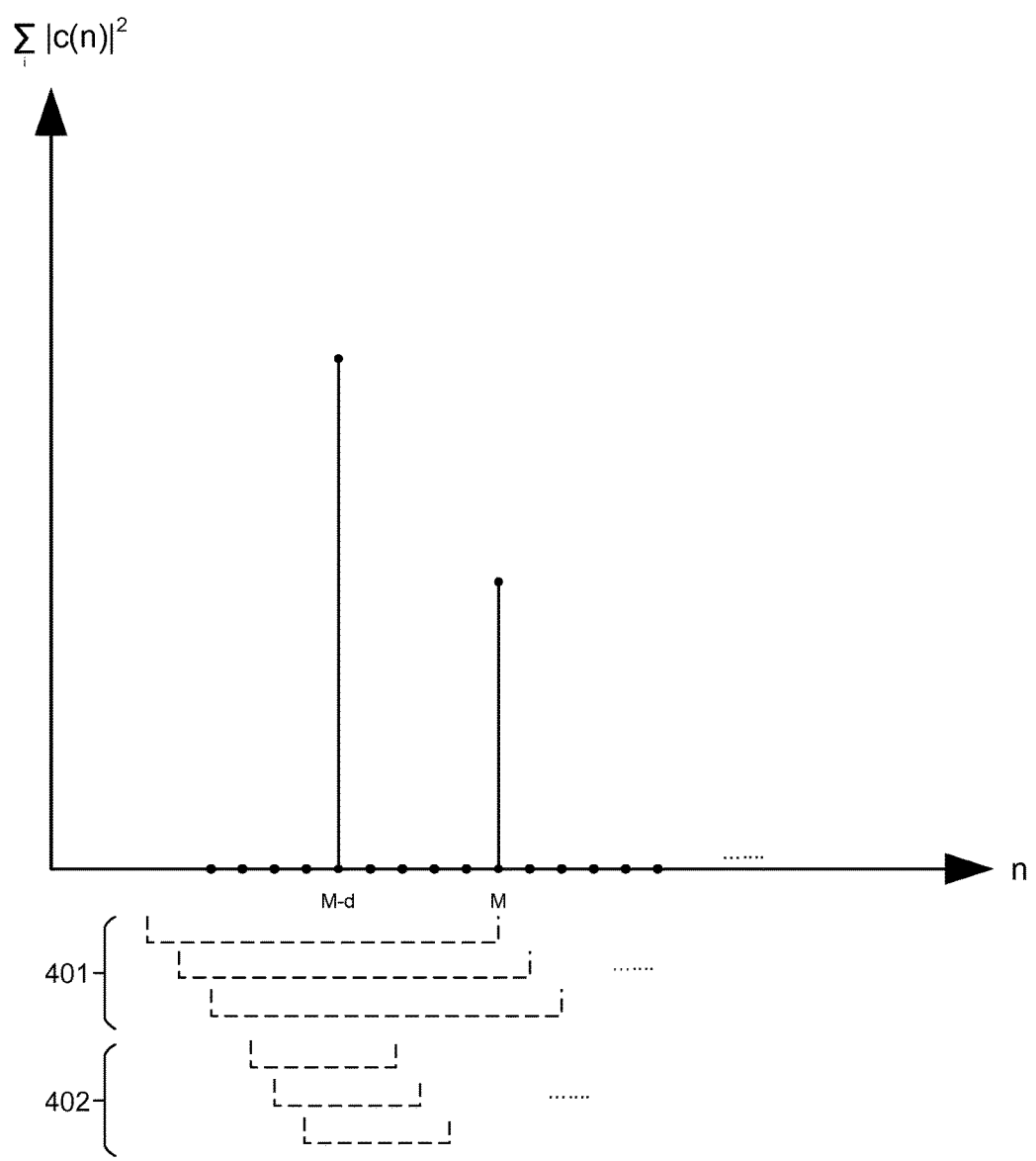
FIG. 4 shows an example channel impulse response for system with 2 transmit antennas and $N_{RX}$ receive antennas.

FIG. 4 shows a channel impulse response for an example of a narrow band channel in a MIMO system with 2 transmit antennas, where the shift delay is $-d$. As shown, in a noise free environment, two peaks at M and M-d are obtained.

The method described above of determining the highest energy window and the earliest tap in that window can be used to estimate the FSB for standard packets where the GI is longer than d. In this case, as shown in FIG. 4, the window 401 size is greater than d and so is able to cover both M and M-d peaks. However, in the scenario of HT or VHT packets with a short GI, the short GI may be less than d and so the shorter window size 402 corresponding to the short GI may not be sufficient to cover both peaks. Thus, if the peak at M-d is greater than the peak at M, then the window doesn't cover the peak at M, giving a false FSB reading. To account for this, the following procedure is used for the case of a $2 \times N_{rx}$ MIMO and HT or VHT packets.

The maximum energy peak tap location $n_{max}$ is determined from the sum of absolute square of resultant channel $\Sigma_i|c_i(n)|^2$. Also, using the method described above in relation for FIG. 3, the tap location $n_{LGI}$ of the FSB using a window size for the long GI is determined. The following equation determines whether the peak at $n_{max}$ belongs to $\Sigma_i|h_{i1}(n)|^2$ or $\Sigma_i|h_{i2}(n)|^2$ (i.e. the channel between the first transmitter antenna and the $i^{th}$ receive antenna or the channel between the second transmitter antenna and the $i^{th}$ receive antenna respectively):

$$n_{LGI}-n_{max}=\begin{cases}\geq W_S \Longrightarrow \text{peak at } M \text{ is the maximum}\\ < W_S \Longrightarrow \text{peak at } M-d \text{ is the maximum}\end{cases}$$

where $W_S$ is the number of taps (i.e. samples) in the short GI window of 0.4 µs.

Once the peak location has been determined, the method described above for determining the FSB is carried out for a range of samples between $n_{start}$ and $n_{end}$, which are defined as:

$$n_{start}=n_c-W_S+1$$

$$n_{end}=n_c+W_S-1$$

where $n_c$ is the position of the highest energy peak M for channel between first antenna and the $i^{th}$ receive antenna and is determined by:

$$n_C=\begin{cases}n_{max} & \text{if } N_{LGI}-n_{max}\geq W_S-1\\ n_{max}+d & \text{if } N_{LGI}-n_{max}<W_S\end{cases}$$

The window of short GI size moves along the x-axis one tap at a time from $n_{start}$ to $n_{end}$ to determine the energy of $W_S$ taps within that range. The window position with the greatest energy is determined and the first (i.e. earliest) tap in that window corresponds to the location of the FSB for the HT or VHT packet transmitted by the first antenna of the transmitter. By carrying out the FSB determination within the $n_{start}$ and $n_{end}$ range, ISI from the channel between the second transmit antenna and the $i^{th}$ receive antenna can be avoided to give a more accurate FSB location.

Figure 5:
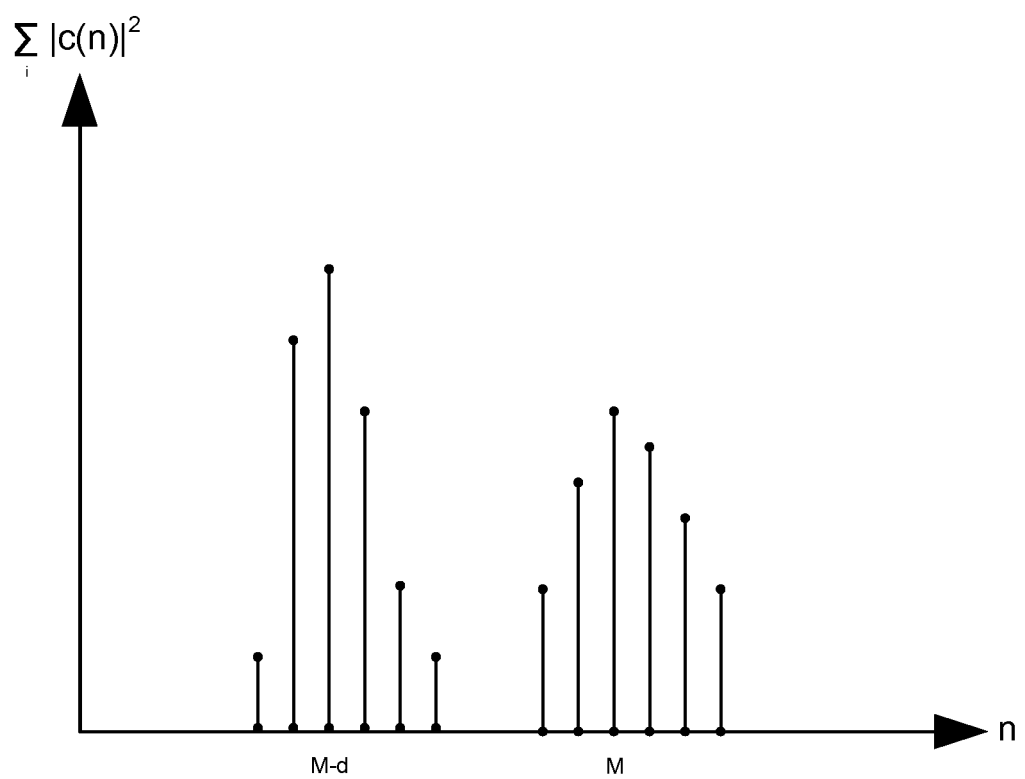
FIG. 5 shows an example channel impulse response for a wide band channel in a system with 2 transmit antennas and $N_{RX}$ receive antennas.

In certain cases where a wide band channel is used in a $2 \times N_{Rx}$ MIMO, the channels between the first and second transmit antennas and the $i^{th}$ receive antenna can contain multiple paths. Thus, the channels can contain precursor, post-cursor and line of sight components. FIG. 5 shows an example of this, where the channels for the first and second transmit antennas $\Sigma_i |h_{i1}(n-M)|^2$ and $\Sigma_i |h_{i2}(n-M+d)|^2$ respectively have 2 precursors, 3 post-cursors and a line of sight component. In this case $n_{start}$ is decided based on the number of precursors that are required to be covered and the FSB is determined as described above.

However, if the width of the channels is greater than the number of samples corresponding to the shift d, then the channels will overlap with each other, which may affect the FSB detection. Thus prior to carrying out the FSB detection using this method, the FSB estimator 207 may detect the channel type and width and determine the number of precursors required to be covered.

In the case of a $N_{Tx} \times N_{Rx}$ MIMO systems for narrow- and wide-band channels, additional LTFs are transmitted which are used to compute channel estimates $h_{ij}^E(n)$, where i=1, 2, . . . , $N_{Rx}$ and j=1, 2, . . . , $N_{Tx}$. The channels $h_{ij}^E(n)$ are decoupled channels and the methodology described above in relation to FIG. 3 can be applied to the sum of absolute square of decoupled channel $\Sigma_i |h_{i1}^E(n)|^2$ to determine the FSB for $h_{i1}^E(n)$.

Figure 6:
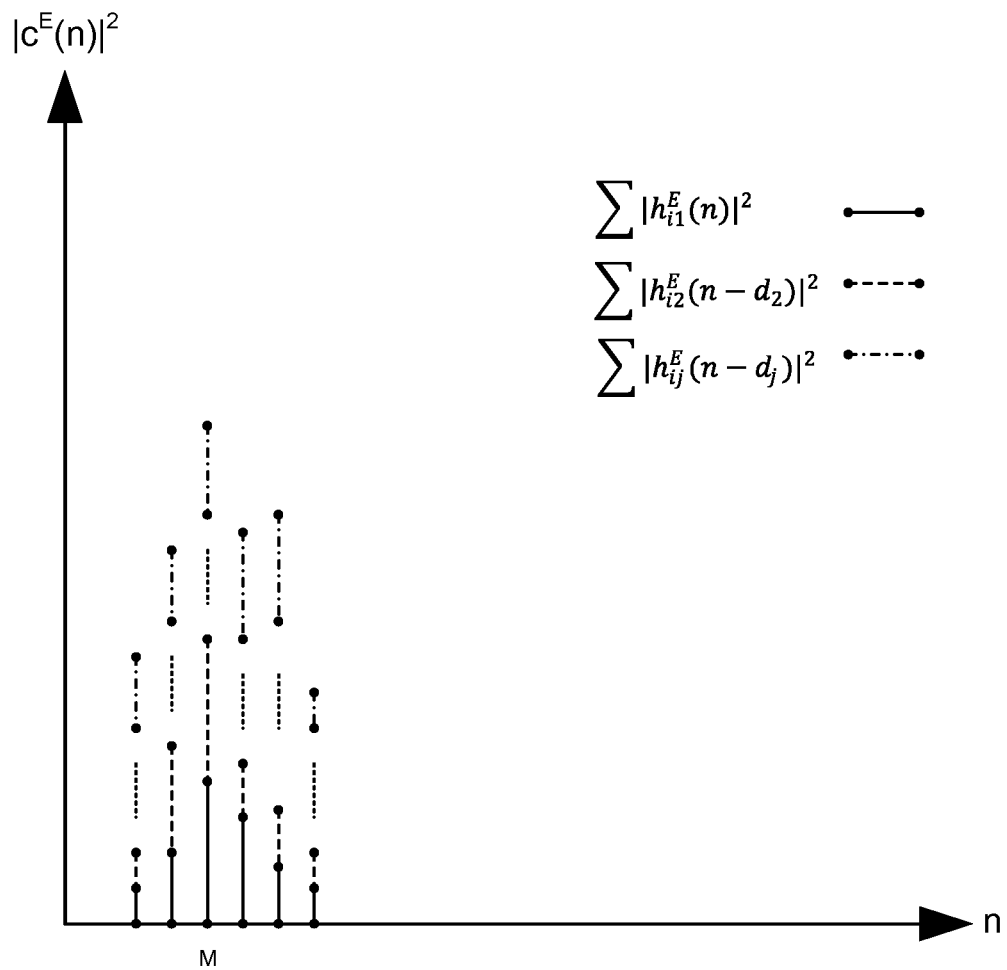
FIG. 6 shows an example of summing channel impulse responses for a wide band channel in a system with $N_{Tx}$ transmit antennas and $N_{Rx}$ receive antennas.

Alternatively, in the case of $N_{Tx} \times N_{Rx}$ MIMO systems, rather than determining the FSB for $h_{i1}^E(n)$, the shifted versions of the estimated channels $h_{ij}^E(n)$ are summed. The sum of the absolute square of resultant channel $|c_{ij}^E(n)|^2$ is given by $$|c_{ij}^E(n)|^2 = \sum_j \sum_i |h_{ij}^E(n-d_{cj})_N|^2$$

where N is the duration of the long preamble and $d_j$ is the cyclic shift for the $j^{th}$ transmit antenna. The values for $d_j$ are predefined values, for example as defined in the IEEE 802.11 standard. $|c_{ij}^E(n)|^2$ for an example signal is shown in FIG. 6. The FSB for the resultant channel $|c_{ij}^E(n)|^2$ can be found using the sliding window method described above.

The receiving device configured in accordance with the examples described herein could be embodied in hardware, software or any suitable combination of hardware and software. The receiving device of the examples described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing system, and/or heterogeneous processors comprising one or more dedicated, programmable and general purpose processing functionalities. In the examples described herein, the transmitting and receiving devices comprise one or more processors and one or more memories having program code stored thereon, the data processors and the memories being such as to, in combination, provide the claimed data processing systems and/or perform the claimed methods.

Data processing units described herein (e.g. ADC 202, coarse boundary estimator 203, symbol aligner 204, FFT unit 205, packet processor 206 and FSB estimator 207) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the data processing methods described herein could be performed by one or more physical processing units executing program code that causes the unit(s) to perform the data processing methods. Each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for detecting a symbol boundary between symbol intervals in a data packet comprising a guard interval preceding a preamble having a predetermined sequence of symbols, the method comprising:
   receiving a signal representing a data packet, the signal comprising a first signal transmitted from one antenna and one or more other signals transmitted from respective one or more other antennas, said other signals being the same as the first signal and shifted by predetermined amount of time;
   sampling the received signal at a specified sampling rate to obtain a set of samples;
   estimating channel impulse responses from the set of samples in dependence on the predetermined sequence of symbols of the preamble;
   determining an energy value for each of a plurality of first windows of channel impulse responses, each of the first windows corresponding to W number of consecutive samples, W being an integer greater than 1, the energy value for each of the first windows being indicative of the total energy associated with the channel impulse responses of that window;
   determining which of the first windows has the greatest energy value;

identifying the earliest sample $n_{lgi}$ of the consecutive W samples in the determined greatest energy first window;

calculating a sample range in dependence on sample $n_{lgi}$ a peak sample $n_{max}$ and a $W_s$ number of samples corresponding to the duration of a short guard interval;

determining an energy value for each of a plurality of second windows of channel impulse responses, each second window corresponding to $W_s$ number of consecutive samples, the plurality of second windows being within the sample range, the energy value for each second window being indicative of the total energy associated with the channel impulse responses of respective $W_s$ samples;

determining which second window has the greatest estimated energy value; and identifying the earliest sample of the consecutive $W_s$ samples in said determined second window, the earliest sample being indicative of a symbol boundary in said data packet.

2. A method as claimed in claim 1, wherein W is dependent on the sampling rate and a duration of the guard interval.

3. A method as claimed in claim 1, wherein W corresponds to a number of samples for the duration of a long guard interval.

4. A method as claimed in claim 1, wherein said step of calculating a sample range comprises:

identifying the channel impulse response having the greatest energy as $n_{max}$; and determining if $n_{max}$ is for the first signal or the one of the other signals in dependence on $n_{lgi}$ and $W_s$.

5. A method as claimed in claim 4, wherein the maximum magnitude of the shift is d and said step of calculating the sample range comprises setting the start of the range as $n_c-W_s+1$, and the end of the range as $n_c-W_s-1$, wherein $n_c=n_{max}$ if $n_{max}$ is for the first signal or $n_c=n_{max}-d$ if $n_{max}$ is for one of the other signals.

6. A method as claimed in claim 1, wherein the maximum magnitude of the shift is d and the first and other signals are transmitted over channels having a channel width corresponding to less than d.

7. A method as claimed in claim 1, wherein the received signal comprises a first signal transmitted from a first transmit antenna and a plurality of shifted signals transmitted from a plurality of other transmit antennas, each shifted signal being shifted by a different predetermined amount time from the first signal, and the first and other signals being received at a corresponding number of receive antennas, the method further comprising:

decoupling the channel impulse response for the channels between each transmit antenna and each receive antenna; and summing the decoupled channel impulse responses, said step of determining an energy value for each of a plurality of sets being carried out on the summed channel impulse responses.

8. A receiver comprising:

a plurality of antennas configured to receive a signal representing a data packet, wherein each data packet comprises a guard interval preceding a preamble having a predetermined sequence of symbols, the received signal comprises a first signal transmitted from one transmit antenna and one or more other signals transmitted from respective one or more other transmit antennas, said other signals being the same as the first signal and shifted by predetermined amount of time;

a sampler configured to sample the received signal at a specified sampling rate to obtain a set of samples; and a symbol boundary estimator configured to:

estimate channel impulse responses from the set of samples in dependence on the predetermined sequence of symbols of the preamble;

determine an energy value for each of a plurality of first windows of channel impulse responses, each of the first windows corresponding to W number of consecutive samples, W being an integer greater than 1, the energy value for each of the first windows being indicative of the total energy associated with the channel impulse responses of that window;

determine which of the first windows has the greatest energy value;

identify the earliest sample $n_{lgi}$ of the consecutive W samples in the determined greatest enemy first window;

calculate a sample range in dependence on sample $n_{lgi}$, a peak sample $n_{max}$ and a number $W_s$ of samples corresponding to the duration of a short guard interval;

determine an enemy value for each of a plurality of second windows of channel impulse responses, each second window corresponding to $W_s$, number of consecutive samples, the plurality of second windows being within the sample range, the energy value for each second window being indicative of the total enemy associated with the impulse responses of respective $W_s$, samples;

determine which second window has the greatest estimated energy value; and identify the earliest sample of the consecutive $W_s$ samples in said determined second window, the earliest sample being indicative of a symbol boundary in the data packet.

9. A receiver as claimed in claim 8, wherein the plurality of first windows comprises successive first windows of W samples, each successive first window being offset by one sample from a previous first window in the succession.

10. A receiver as claimed in claim 8, wherein W is dependent on the sampling rate and a duration of the guard interval.

11. A receiver as claimed in claim 8, wherein the guard interval duration is 0.8μs or 0.4μs.

12. A receiver as claimed in claim 8, wherein the data packet further comprises a training field preceding the guard interval, the symbol boundary estimator being further configured to estimate a boundary between the training field and the guard interval, the set of samples being taken from said estimated boundary for a period corresponding to the duration of the preamble.

13. A receiver as claimed in claim 8 wherein W corresponds to a number of samples for the duration of a long guard interval.

14. A receiver as claimed in claim 8, wherein the symbol boundary detector is configured to calculate the sample range by:

identifying the channel impulse response having the greatest energy as $n_{max}$; and determining if $n_{max}$ is for the first signal or one of the other signals in dependence on $n_{lgi}$ and $W_s$.

15. A receiver as claimed in claim 14, wherein the maximum magnitude of the shift is d and the symbol boundary detector is configured to calculate the sample range by setting the start of the range as $n_c-W_s+1$, and the end of the range as $n_c-W_s-1$, wherein $n_c=n_{max}$ if $n_{max}$ is for the first signal or $n_c=n_{max}-d$ if $n_{max}$ is for one of the other signals.

16. A receiver as claimed in claim 8, wherein the maximum magnitude of the shift is d and the first and other signals are transmitted over channels having a channel width corresponding to less than d.

17. A receiver as claimed in claim 8, wherein the received signal comprises a first signal transmitted from a first transmit antenna and a plurality of shifted signals transmitted from a plurality of other transmit antennas, each shifted signal being shifted by a different predetermined amount time from the first signal, and the receiver comprising a corresponding number of receive antennas configured to receive the first and other signals, the symbol boundary estimator being further configured to:

decouple the channel impulse response for the channels between each transmit antenna and each receive antenna; and sum the decoupled channel impulse responses, said step of determining an energy value for each of a plurality of sets being carried out on the summed channel impulse responses.

18. A non-transitory computer readable storage medium having stored therein processor executable instructions that when executed cause at least one processor to:

receive a signal representing a data packet, the signal comprising a first signal transmitted from one antenna and one or more other signals transmitted from respective one or more other antennas, said other signals being the same as the first signal and shifted by predetermined amount of time;

sample the received signal at a specified sampling rate;

estimate channel impulse responses from a set of samples in dependence on the predetermined sequence of symbols of the preamble;

determine an energy value for each of a plurality of first windows of channel impulse responses, each of the first windows corresponding to W number of consecutive samples, where W is an integer greater than one, the energy value for each of the first windows being indicative of the total energy associated with the channel impulse responses of that window;

determine which of the windows has the greatest energy value;

identify the earliest sample $n_{lgi}$ of the consecutive W samples in the determined greatest energy first window;

calculate a sample range in dependence on sample $n_{lgi}$, a peak sample $n_{max}$ and a $W_s$ number of samples corresponding to the duration of a short guard interval;

determine an energy value for each of a plurality of second windows of channel impulse responses, each second window corresponding to $W_s$ number of consecutive samples, the plurality of second windows being within the sample range, the energy value for each second window being indicative of the total energy associated with the channel impulse responses of respective $W_s$ samples;

determine which second window has the greatest estimated enemy value; and identify the earliest sample of the consecutive $W_s$ samples in said determined second window, the earliest sample being indicative of a symbol boundary in the data packet.

* * * * *